United States Patent [19]

Rousseau et al.

[11] 4,212,200

[45] Jul. 15, 1980

[54] INSTANTANEOUS FLOW METER FOR AUTOMOBILE VEHICLES

[75] Inventors: Alain Rousseau, Paris; Francois Ramel, Levallois, both of France

[73] Assignee: Transformateurs BC and EFFA, France

[21] Appl. No.: 933,210

[22] Filed: Aug. 14, 1978

[51] Int. Cl.² ............................................... G01F 1/38
[52] U.S. Cl. ............................ 73/861.47; 73/861.52
[58] Field of Search ................ 73/205 R, 205 L, 211, 73/213, 717–722

[56] References Cited

U.S. PATENT DOCUMENTS

| | | | |
|---|---|---|---|
| 2,052,720 | 9/1936 | MacLean et al. | 73/211 X |
| 2,692,501 | 10/1954 | Erwood | 73/722 |
| 2,715,680 | 8/1955 | Tatel et al. | 73/722 X |
| 3,779,076 | 12/1973 | Akeley | 73/211 |
| 3,822,592 | 7/1974 | Siegel et al. | 73/211 |
| 3,967,504 | 7/1976 | Akeley | 73/722 |
| 4,015,473 | 4/1977 | Kleuter et al. | 73/205 |
| 4,096,746 | 6/1978 | Wilson et al. | 73/205 |

*Primary Examiner*—Herbert Goldstein
*Attorney, Agent, or Firm*—William A. Drucker

[57] ABSTRACT

A flow meter, particularly applicable to the instantaneous measurement of an automobile vehicle's fuel consumption, includes an enclosure separated into two chambers by a flexible membrane which operates in conjunction with compression springs. The fuel enters the bottom chamber and, in the top chamber, goes through a pipe which provides a calibrated pressure drop. A pick-up measures the resultant membrane movements.

6 Claims, 4 Drawing Figures

INSTANTANEOUS FLOW METER FOR AUTOMOBILE VEHICLES

BACKGROUND OF THE INVENTION

The present invention relates to flow meters. Known flow meters have drawbacks which make them unsuitable for measuring microflows, particularly under certain conditions, notably those which are encountered when measuring the pulsed flow of fuel consumed by an automobile vehicle. Vane flow meters are only suitable for relatively large flows and are very complicated when they are intended for measuring instantaneous flows. The electronics of thermometric bridge flow meters are elaborate, therefore costly and are sensitive to the thermal parameters of fluids, to ambient temperature, and to inclination. Float flow meters have the drawback that they do not supply a reading in the form of an electrical magnitude. Vortex flow meters are sensitive to dynamic variations and unsuitable for low flows.

OBJECT OF THE INVENTION

The present invention aims at overcoming these drawbacks and its object is to provide an accurate instantaneous flow meter for measuring liquid or gas flows, insensitive to shocks and vibrations, to variations of thermal magnitudes and to lack of horizontality. Further, the flow meter can be made simply and cheaply, with a view to being applied to automobiles.

SUMMARY OF THE INVENTION

The flow meter according to the invention includes: a piping unit connectable to the piping in which the fluid whose flow is to be measured circulates, said piping unit comprising means for introducing a calibrated pressure drop; and means for measuring the difference in fluid pressures upstream and downstream of the pressure drop. It is characterised in that said measuring means include: an hermetic enclosure connected to said piping; a flexible membrane imperviously separating said enclosure into a first and a second chambers; means for positioning said membrane allowing it to move resiliently in a direction perpendicular to its surface; and a transducer component converting said movement into a flow-indicating electric signal.

According to a preferred embodiment, the first chamber comprises a fluid intake hole, said piping unit connects the first chamber to the second, and the second chamber is provided with a fluid exit hole.

Other features and advantages of the invention, will be apparent from the following description.

DESCRIPTION OF THE PREFERRED EMBODIMENT

Figure 1:
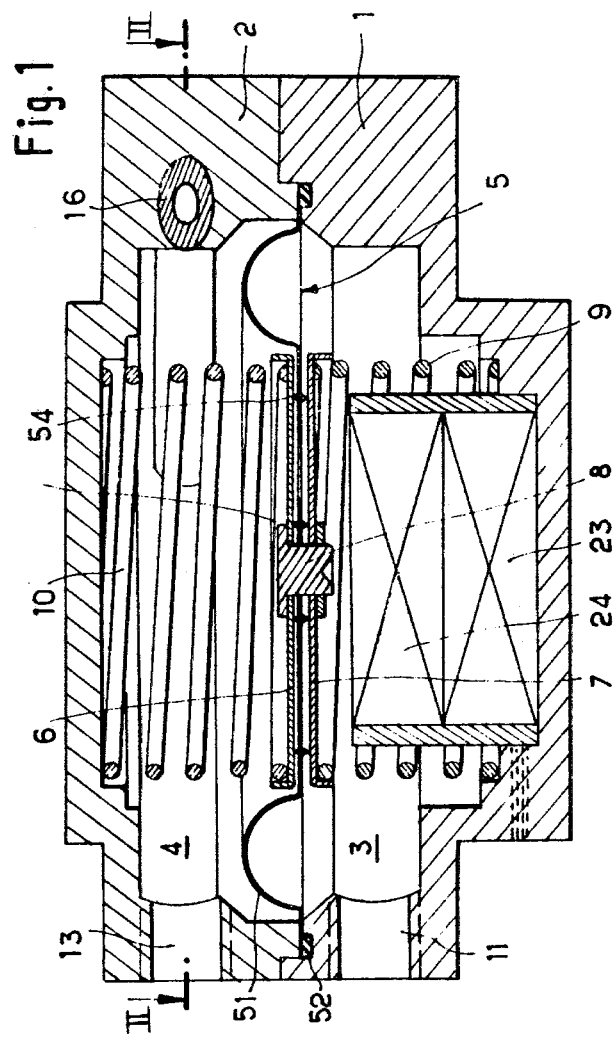
FIG. 1 is a vertical section taken on the line I—I in FIG. 2, of a flow meter according to the preferred embodiment of the invention.

The instrument is in the form of a flat cylindrical body advantageously constituted by a two-piece mounting 1 and 2 fitted together and assembled by screws such as 12, forming a bottom chamber 3 and a top chamber 4 separated by a membrane 5. The latter, made of a hydrocarbon-resistant metal or elastomer, is very flexible and has a thin centre disc, e.g. 3 mm thick, surrounded by a semi-annular part 51 (FIG. 1), itself surrounded by a flat annular rim 52 embedded between the two parts of the cylindrical body. The centre part of the membrane is sandwiched between two metal cheeks 6 and 7 in the shape of cups, fixed to the membrane by means of a centre rivet 8 and moving with it.

Two helicoidal compression springs 9 and 10, centred on the perpendicular line in the centre of the membrane, are respectively fixed at one end to the horizontal wall of chambers 3 and 4 and, at the other end, to the two respective cheeks in which they engage. The springs are thus accurately positioned and the centre part of the membrane can only move in a direction perpendicular to its surface.

The cheeks also rigidify the centre part of the membrane, while the outer half-ring unfolds to a greater or lesser degree according to the difference in pressure between the two chambers and prevents the rigidity of the membrane from intervening to any notable extent to exert a spurious return effect on the springs.

These requirements proved to be essential to obtain a reading at low flows, when the movement of the membrane is very slight, of the order of 1/100th of a millimeter, for example.

The instrument is positioned between the pump, connected to an intake hole 11 formed in the side wall of chamber 3, and the vehicle's engine, connected to an exit hole 13 formed in the side wall of chamber 4, or between the pump and the tank. The fuel goes into chamber 3 at 11 and passes into chamber 4 through a vertical channel comprising two portions 14 and 15 with different sections, to facilitate centring.

Channel portion 15 opens laterally into a pressure drop unit 16 arranged horizontally in chamber 4 and which comes out close to exit hole 13.

Channel 15 is formed in a removable part 17, on which rests a part cut out of sheet metal 18, screwed at 19. This part also serves to position the jet. Seals 20–22 are provided.

Figure 2:
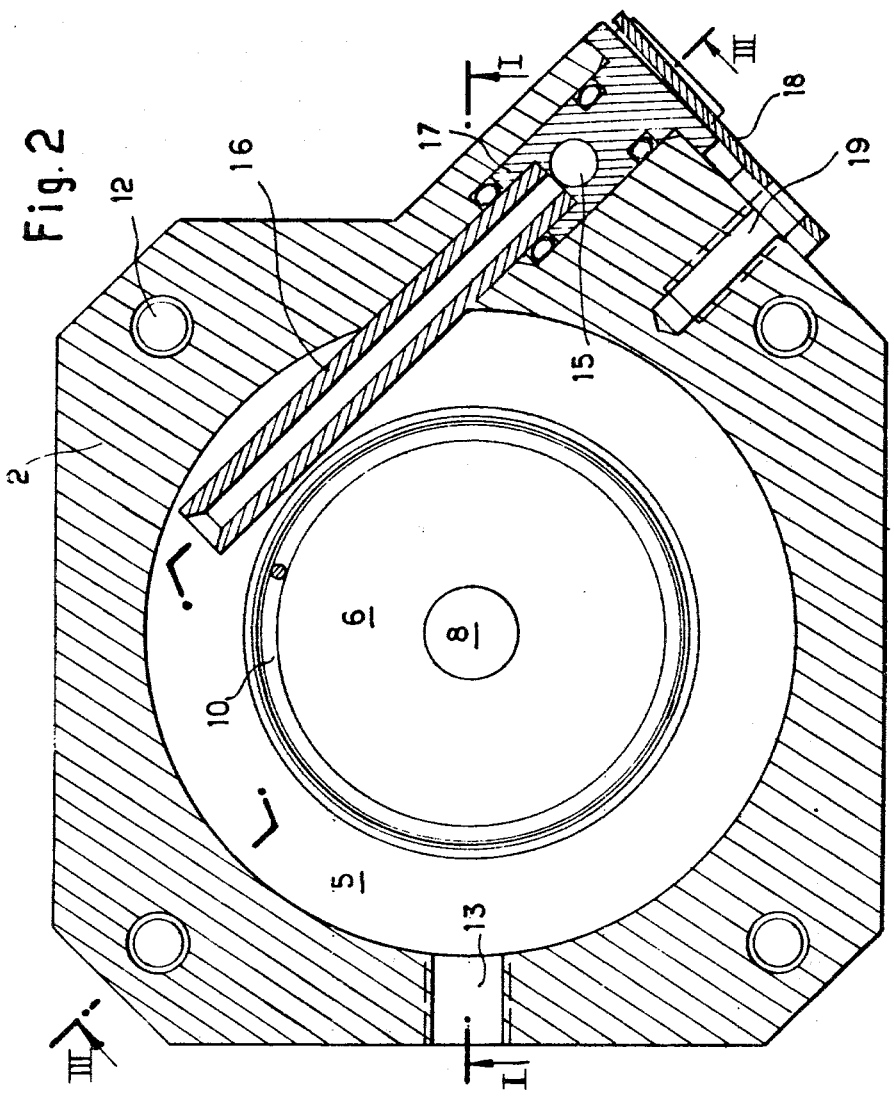
FIG. 2 shows the flow-meter in horizontal section taken on the line II—II in FIG. 1.
Figure 3:
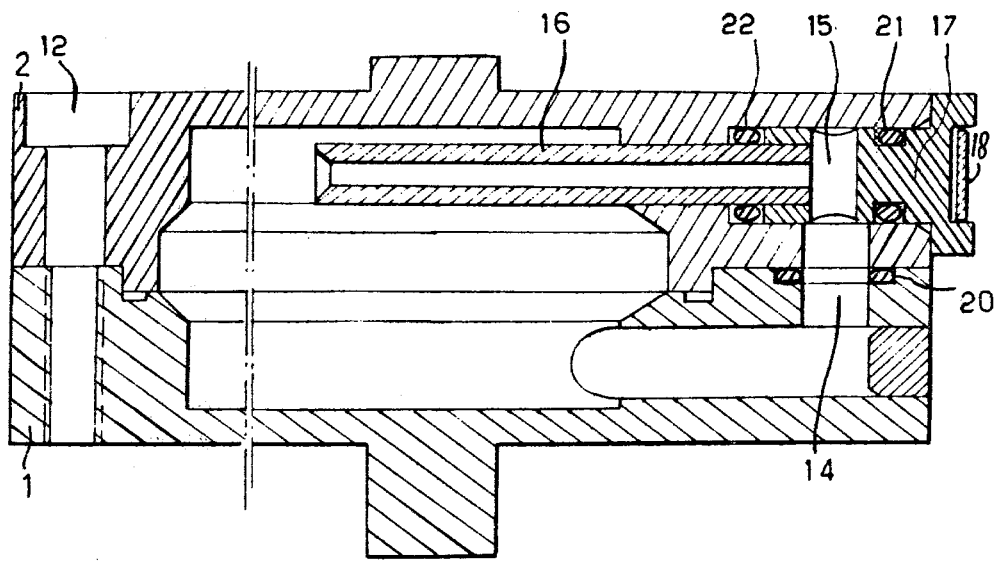
FIG. 3 shows the flow-meter in vertical section taken on the line III—III in FIG. 2, the components inside the body of the instrument having been removed.

A movement pick-up comprising two superimposed coils 23–24 (FIGS. 1 and 4) unconnected to each other, is housed in chamber 3, the top coil 24 being situated close to cheek 7 (FIGS. 1 to 3 are, for example, twice scale size. The unit with the two coils is embedded in an insulating resin cladding and the electric conductors go through the bottom of chamber 3.

Figure 4:
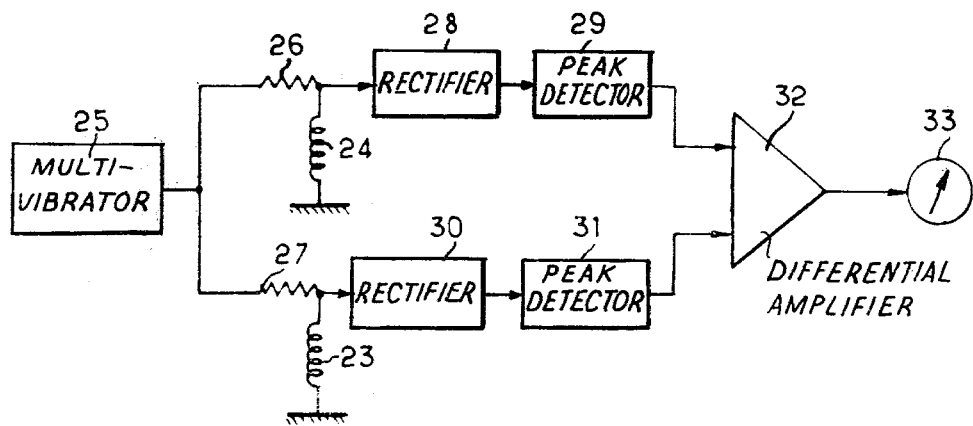
FIG. 4 is a basic diagram of the movement pick-up with which the flow-meter is fitted.

As FIG. 4 shows, coils 23 and 24 are excited, through resistors 26 and 27 respectively, by a rectangular signal supplied by a multivibrator 25 and having e.g. a frequency of 30 kHz. The field induced in coil 24 gives rise, in cheek 7, to Foucault currents whose intensity varies in terms of distance. The resulting signal is rectified at 28 at the terminals of coil 24, then transmitted to a peak detector 29, itself connected to one input of a differential amplifier 32 where it is compared with the reference signal obtained, from the terminals of coil 23, by rectification at 30 and detection of the peak value at 31.

By way of variant, the coil could be excited by a sinusoidal current and the phase displacement between the currents obtained in the two coils measured.

In both cases, the output signal of the instrument is applied to an instantaneous flow calibrated measuring instrument 33, possibly to a flow integrator.

The principle on which the flow meter described works is as follows:

Pipe 16 constitutes a calibrated pressure drop unit which introduces a pressure drop unit which introduces a pressure difference governed by the flow between the two chambers. This pressure difference moves the membrane and this movement is measured by the pick-up.

Since the flows to be measured vary, e.g. from 1 to 25 liters/hour, it is important to obtain a good degree of accuracy at low flows, and the pressure drop should not be too great at high flows. This result is obtained by taking, for pipe 16, a length/internal diameter ratio at which the pressure drop is due to two suitably balanced effects, viz: a friction effect against the inside wall of an elongated pipe, which gives a substantially linear response, and a shock effect against a hole, which gives a quadratic response. Experience has shown that, in the case of petrol, dimensions close to 45 mm length and 2 mm diameter gives satisfactory results. The response obtained corresponds, at flows exceeding a few liters/hour, to a substantially linear curve and, at low flows, to a curve such that a pressure difference becomes apparent as soon as a non-nil flow exists. For example, a pressure variation of 0.2 millibars is obtained at 1 liter/hour, 2.7 millibars at 5 liters/hour, 8.5 millibars at 10 liters/hour and 21 millibars at 17 liters/hour.

It will be noted that a capillary tube would be unusable in practice, because of the length that it would have to have.

It will also be noted that the pressure drop is insufficient, even at high flows, to stall the engine. In case of sudden acceleration, the resultant movement of the membrane has the effect of expelling a certain volume of petrol from the chamber 4, which moreover helps to prevent the engine stalling.

Although the relative position of the two chambers can be reversed, it is preferable for the intake chamber 3 to be at the bottom. It then serves to decant the petrol, preventing solid particles from falling on the membrane and changing the instrument's zero.

It will be noted that the communicating hole between chamber 3 and channel 14 is opposite intake 11 and about mid-way up the chamber. This positioning allows some degree of de-gassing of the petrol, preventing gas bubbles from reaching the membrane.

The centre portion of the membrane is moveover protected by annular projections such as 52, 53 comprised therein and which operate in conjunction with the cheeks to provide a seal.

The instrument is insensitive to shocks and vibrations and only slightly sensitive to temperature. The electronic circuits of the pick-up can moveover comprise a resistor with a negative temperature coefficient designed to compensate for the effect thereof.

The movement pick-up, since it has no contact with the membrane, introduces no distortion into the measurement.

By way of variant, the pressure drop unit could be positioned outside body 1, 2 and connected to a hole formed in the wall of the bottom chamber opposite the intake hole. A pipe, positioned downstream of this unit, would then be connected to the top chamber. In this variant, the fluid exit would be downstream of the pressure drop and the fluid would not go through the top chamber, only the pressure downstream of the pressure drop being transmitted thereto. This variant, satisfactory for a gas, is less satisfactory for a liquid, since the rise of liquid in the pressure transmission piping can give rise to error and to a de-gassing problem in the top chamber.

Application of the instrument to the measurement of a pulsed flow of fuel is not limitative but is of particular industrial utility.

I claim:

1. A flow meter connectable to the piping in which circulates the fluid whose flow is to be measured, said flow meter comprising: flow restrictor means for introducing a calibrated pressure drop; a hermetic enclosure connected to said piping; a flexible membrane imperviously separating said enclosure into a first and a second chamber; means for positioning said membrane allowing it to move resiliently in a direction perpendicular to its surface; and a transducer component converting said movement into a flow-indicating electrical signal, said flow restrictor means being housed in the second chamber, and communication piping between the two chambers, fitted in one wall of the enclosure, making the flow restrictor means communicate with the first chamber, a fluid intake hole being formed in one wall of the first chamber, and an exit hole being formed in one wall of the second chamber.

2. A flow meter according to claim 1, wherein said membrane includes a plane centre part surrounded by a semi-annular part and two cup-shaped metal parts respectively integrated with the two faces of the centre part and each operating in conjunction with the one end of a helicoidal compression spring centred on the perpendicular line in the centre of the membrane, the said end engaging the said cup-shaped part, the other end of the spring being fixed to a wall of the enclosure.

3. A flow meter according to claim 1, wherein said transducer component comprises two superimposed coils unconnected with each other, generator means for supplying the respective coils with the same rectangular electric current signals, the top coil being mounted close to the membrane and means for measuring the difference in amplitude between the currents which go through said coils when the membrane is moved.

4. A flow meter, according to claim 1, wherein the second chamber is superimposed on the first.

5. A flow meter, according to claim 1, wherein said communication piping between the two chambers has an intake hole positioned substantially midway up the first chamber, opposite said fluid intake hole.

6. A flow meter, according to claim 1, wherein the portion of said communication piping between the two chambers which is connected to the flow restrictor means is formed in a removable part of the wall of the second chamber.

* * * * *

UNITED STATES PATENT AND TRADEMARK OFFICE
CERTIFICATE OF CORRECTION

PATENT NO. : 4,212,200

DATED : July 15, 1980

INVENTOR(S) : Alain Rousseau et al.

It is certified that error appears in the above—identified patent and that said Letters Patent is hereby corrected as shown below:

On the title page the assignee should read as follows:

-- [73] Assignee: Transformateurs BC and
EFFA Etudes --.

Signed and Sealed this

Twenty-fourth Day of February 1981

[SEAL]

Attest:

RENE D. TEGTMEYER

Attesting Officer

Acting Commissioner of Patents and Trademarks